United States Patent
Douguet et al.

(10) Patent No.: US 7,822,207 B2
(45) Date of Patent: Oct. 26, 2010

(54) KEY PROTECTION MECHANISM

(75) Inventors: Michel Douguet, Marseilles (FR);
Vincent Dupaquis, Biver (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 917 days.

(21) Appl. No.: 11/615,225

(22) Filed: Dec. 22, 2006

(65) Prior Publication Data

US 2008/0152144 A1      Jun. 26, 2008

(51) Int. Cl.
  *H04L 9/00* (2006.01)
  *G06F 12/14* (2006.01)
  *G06F 1/26* (2006.01)

(52) U.S. Cl. .......................... 380/277; 380/28; 380/29; 380/37; 380/44; 380/47; 380/259; 380/262; 713/159; 713/165; 713/171; 713/182; 713/192; 713/193; 713/194; 726/2; 726/22; 726/23; 726/24; 726/26; 726/34; 726/35; 726/36

(58) Field of Classification Search ................. 380/277; 713/192
  See application file for complete search history.

(56) References Cited

U.S. PATENT DOCUMENTS

| | | | |
|---|---|---|---|
| 5,631,960 A * | 5/1997 | Likens et al. ................... 380/2 |
| 5,887,243 A | 3/1999 | Harvey et al. |
| 5,937,066 A | 8/1999 | Gennaro |
| 5,991,415 A * | 11/1999 | Shamir ........................ 380/30 |
| 6,055,316 A * | 4/2000 | Perlman et al. ............. 380/262 |
| 6,061,791 A * | 5/2000 | Moreau ....................... 713/171 |
| 6,092,229 A * | 7/2000 | Boyle et al. ................. 714/748 |
| 6,240,187 B1 | 5/2001 | Lewis |
| 6,282,290 B1 * | 8/2001 | Powell et al. ................. 380/28 |
| 6,381,699 B2 | 4/2002 | Kocher et al. |
| 6,510,518 B1 | 1/2003 | Jaffe et al. |
| 6,941,284 B2 | 9/2005 | DeFilippo et al. |
| 6,965,673 B1 * | 11/2005 | Boneh et al. .................. 380/28 |
| 6,990,468 B1 | 1/2006 | Berson et al. |
| 7,000,115 B2 | 2/2006 | Lewis |
| 7,039,816 B2 | 5/2006 | Kocher et al. |

(Continued)

FOREIGN PATENT DOCUMENTS

WO    WO-2008/079524 A2    7/2008

OTHER PUBLICATIONS

S. Mangard, "A Simple Power-Analysis (SPA) Attack on Implementations of the AES Key Expansion", ICISC 2002, LNCS 2587, 2003, pp. 343-358.

(Continued)

*Primary Examiner*—Christian LaForgia
*Assistant Examiner*—Jenise E Jackson
(74) *Attorney, Agent, or Firm*—Schwegman, Lundberg & Woessner, P.A.

(57) ABSTRACT

A method of protecting secret key integrity in a hardware cryptographic system includes first obtaining an encryption result and corresponding checksum of known data using the secret key, saving those results, then masking the secret key and storing the masked key. When the masked key is to be used in a cryptographic application, the method checks key integrity against fault attacks by decrypting the prior encryption results using the masked key. If upon comparison, the decryption result equals valid data, then the key's use in the cryptographic system can proceed. Otherwise, all data relating to the masked key is wiped from the system and fault injection is flagged.

10 Claims, 1 Drawing Sheet

U.S. PATENT DOCUMENTS

| | | | |
|---|---|---|---|
| 7,051,199 | B1 | 5/2006 | Berson et al. |
| 7,400,723 | B2 * | 7/2008 | Romain et al. ............... 380/28 |
| 7,454,625 | B2 * | 11/2008 | Fischer et al. ............... 713/189 |
| 2001/0033656 | A1 * | 10/2001 | Gligor et al. ............... 380/28 |
| 2002/0178371 | A1 * | 11/2002 | Kaminaga et al. ............ 713/189 |
| 2003/0023850 | A1 * | 1/2003 | Brown et al. ............... 713/176 |
| 2003/0223579 | A1 | 12/2003 | Kanter et al. |
| 2003/0229598 | A1 * | 12/2003 | de Jong ............... 705/72 |
| 2005/0243998 | A1 | 11/2005 | Plessier |
| 2005/0289311 | A1 | 12/2005 | Durham et al. |
| 2006/0050868 | A1 * | 3/2006 | Bockes et al. ............... 380/28 |
| 2006/0120521 | A1 | 6/2006 | Whitehead |
| 2007/0180541 | A1 * | 8/2007 | Shu et al. ............... 726/34 |

OTHER PUBLICATIONS

R. Karri et al., "Parity-Based Concurrent Error Detection in Symmetric Block Ciphers", IEEE, Int'l Test Conference, 2003, pp. 919-926.

H.E. Link et al., "Clarifying Obfuscation: Improving the Security of White-Box Encoding", Cryptology ePrint Archive: Report May 2004, 11 pages (Int'l Assoc. for Cryptologic Research, 2004.).

H. Bar-El, "Security Implications of Hardware vs. Software Cryptographic Modules", printout: Discretix Technologies, Ltd. @discretix. com, Mar. 2004, 3 pages.

S.M. Yen et al., "Checking Before Output May Not Be Enough Against Fault-Based Cryptanalysis", IEEE Transactions on Computers, 49(9), 2000, pp. 967-970.

R. Anderson et al., "Cryptographic Processors—a Survey", Univ. Of Cambridge, Computer Laboratory, Technical Report, No. 641, Aug. 2005, 19 pages.

E. Biham et al., "Differential Fault Analysis of Secret Key Cryptosystems", Advances in Cryptology—CRYPTO '97, LNCS 1294, 1997, pp. 513-525.

H. Bar-El et al., "The Sorcerer's Apprentice Guide to Fault Attacks", Workshop on Fault Detection and Tolerance in Cryptography, Florence Italy, Jun. 30, 2004. (Also IEEE, vol. 94, No. 2, Feb. 2006).

D. Boheh et al., "On the Importance of Checking Cryptographic Protocols for Faults", Advances in Cryptology—EUROCRYPT -97, LNCS 1233, pp. 37-51.

M. Jacob et al., "Attacking an Obfuscated Cipher by Injection Faults", Proc. of ACM CCS-9 Workshop DRM 2002, Springer LNCS 2696, 2003, pp. 16-31.

R. Anderson et al., "Low Cost Attacks on Tamper Resistant Devices", Security Protocols, 5th Int'l Workshop, Paris, France, Apr. 7-9, 1997, Proc. Springer LNCS 1361, 12 pages.

P. Kocher et al., "Differential Power Analysis", Advances of Cryptology—CRYPTO '99, LNCS 1666, 1999, pp. 388-397.

D. Boneh et al., "On the Importance of Eliminating Errors in Cryptographic Computations", Jour. of Cryptology, 14(2), 2001, 17 pages.

"International Aplication Serial No. PCT/US2007/083426, International Search Report mailed on Jun. 17, 2008", 2 pgs.

"International Aplication Serial No. PCT/US2007/083426, Written Opinion mailed on Jun. 17, 2008", 4 pgs.

* cited by examiner

KEY PROTECTION MECHANISM

TECHNICAL FIELD

The present invention relates to cryptographic systems that are resistant to differential fault analysis or fault injection attacks, to protect the integrity of secret keys.

BACKGROUND ART

When using secret key based algorithms, a fault injection protection mechanism may be required. Such a mechanism is a secure way to protect the secret key against differential fault analysis related to key manipulation. Differential fault analysis is a cryptographic attack that forces transient hardware faults and resulting computational errors, such as during execution of a key scheduling algorithm or of a last encryption round, in order to extract cryptographic key information. This fault analysis is applicable to both public key and secret key cryptosystems, including tamper-resistant devices on smart cards. For example, Eli Biham and Adi Shamir, in "Differential Fault Analysis of Secret Key Cryptosystems", Advances in Cryptology—CRYPTO '97, LNCS 1294, pp. 513-525 (Springer-Verlag, 1997), describe differential fault analysis attacks upon DES-like ciphers.

Currently available protection mechanisms are implemented off-line and are not suitable for all applications. For example, existing mechanisms would not offer protection to session keys, which are generated as needed rather than in advance.

Hagai Bar-El et al., in "The Sorcerer's Apprentice Guide to Fault Attacks", Discretix Technologies White Paper, given at Workshop on Fault Detection and Tolerance in Cryptography, Florence Italy, 30 Jun. 2004 (Cryptology ePrint Archive (eprint.iacr.org) Report 2004/100; also, CiteSeer article 705084), describe various methods or implementing, such fault attacks on electronic cryptographic circuits, and suggest a number of countermeasures. The countermeasures mainly involve introducing redundancy in which operations are recomputed and the results compared, on the assumption that identical faults cannot be replicated. The resulting system is admitted to be slower and less efficient, but that is conceded to be part of the cost of security.

More efficient countermeasures for protecting secret key integrity are sought.

SUMMARY DISCLOSURE

The present invention is a cryptographic method that verifies the integrity of the secret key before using it in a cryptographic application. In particular, a checksum of an encryption result obtained using the original unmasked key is used as a verification signature of valid data upon subsequent decryption of the result with a masked key.

The method of protecting secret key integrity in a hardware cryptographic system that is otherwise subject to fault attacks comprises using the secret key to obtain and save an encryption result from known data and also a checksum of that encryption result, and then masking the secret key. When the masked key is later to be used in a cryptographic application, the integrity of the key is first checked. In particular, the saved encryption result is decrypted with the masked key. If the decryption result is found, upon comparison, to not equal valid data, then the integrity check fails, all data relating to the masked key is wiped from the system and a fault injection is flagged. If the decryption result does equal valid data, then the integrity of the masked key has been certified and can be used in the cryptographic system.

DETAILED DESCRIPTION

Figure 1:
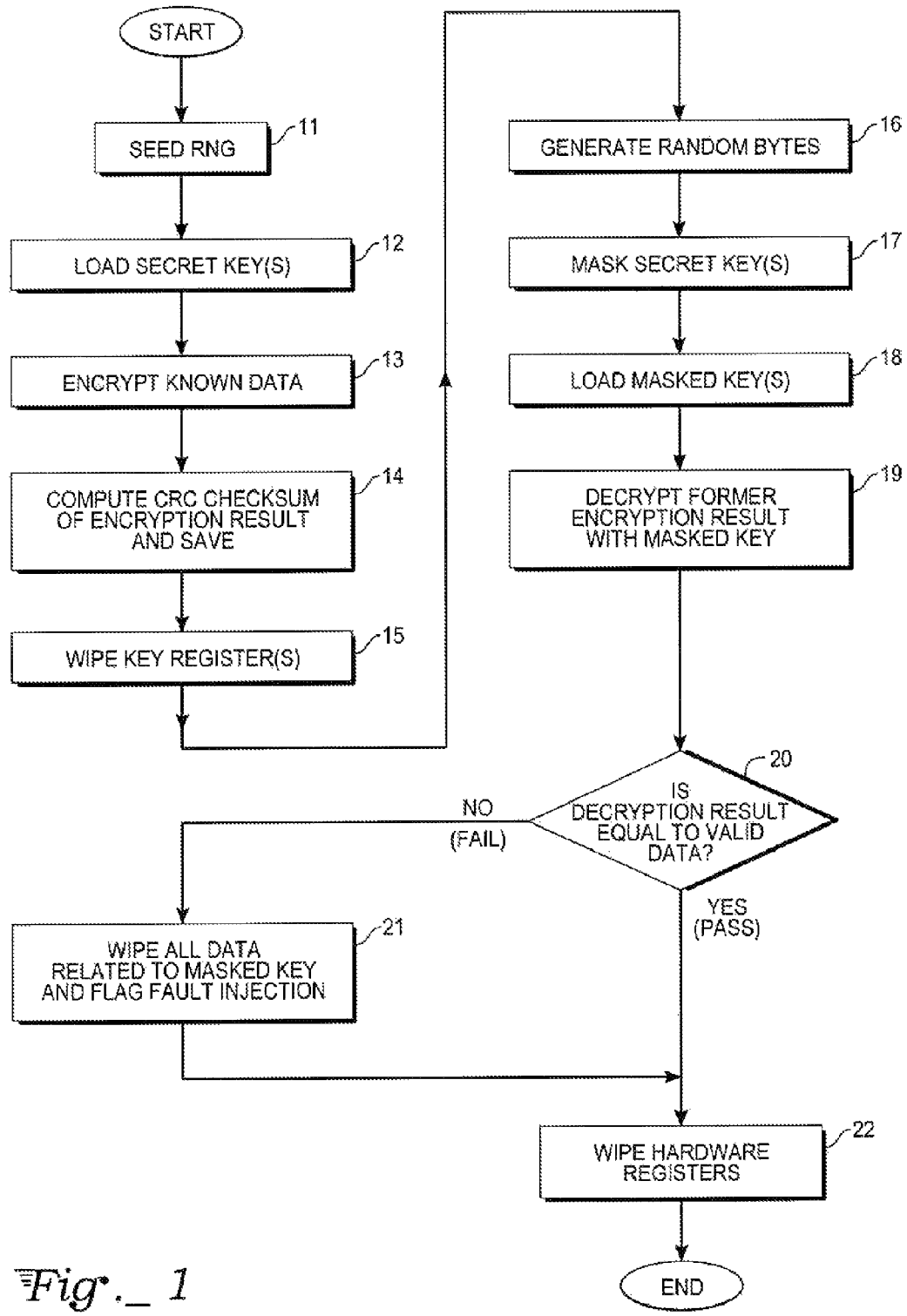
FIG. 1 is a flow diagram of an exemplary embodiment of a key protection method in accord with the present invention.

An exemplary hardware environment, in which the key protection, method of the present invention can operate, may include a hardware random number generator (RNG), a random-access memory (RAM) or non-volatile memory (e.g., a flash EPROM) for secured keys storage, a microprocessor or microcontroller, and some memory to store a program. Additionally, the hardware could potentially include a hardware coprocessor for computing secret-keys based algorithms (DES, AES, etc.). Such a coprocessor, if present, would handle an XOR-based key de-masking mechanism;

Real_Key:=Masked_Key XOR Masking_Value, and likewise

Masked_Key:=Real_Key XOR Masking_Value.

Therefore, it would then no longer be mandatory to manipulate or store a key under its real form, but in its masked form instead. Additionally, the hardware could potentially include a hardware cyclic redundancy check (CRC) module for performing integrity checking. A 16-bit module would be adequate, but other sizes of CRC are also eligible. Nevertheless, the key protection method of the present invention works quite well without a coprocessor and without a hardware CRC module.

With, reference to FIG. 1, a key protection method in accord with the present invention may conveniently begin by seeding the start of a random number generator (RNG), as in step 11. Different seeds produce different random sequences from the RNG. The seeded RNG will be used in later steps for key masking. Hence, the seeding of the RNG (step 11) may occur at any time prior to the generating (step 16) of random bytes needed for the key masking.

The first main part of the procedure (steps 12 through 15) obtains an encryption result and corresponding checksum for use in subsequent integrity checking of the secret key.

A secret key to be protected is loaded (step 12) in plain into a key register. The key may be of any suitable length, depending on the cryptographic algorithm. Also, there may be more than one key, as for example in triple-DES, which uses two or three independent keys in successive sets of rounds for encryption and decryption. The cryptographic algorithm may include a key generation routine in which the secret key (or keys) just loaded into a key register (or registers) is used to generate a sequence of round sub-keys for different rounds of the algorithm. All of these variations are contemplated for key protection in the present invention.

Next, known data for use in key verification (VERIF_DATA) is encrypted (step 13) using the cryptographic algorithm and the key to be protected. A checksum of the encryption result is computed (step 14), for example by using a cyclic redundancy check (CRC) routine. The encryption result and its corresponding checksum are kept as a verification signature for the encryption result, for example, by being stored in a secure memory. The key registers are then wiped clear (step 15).

Next, the previously seeded RNG is used to generate (step 16) random bytes for a key masking operation. The original secret key (or keys) is masked (step 17) with the random bytes, using for example a bitwise XOR of the key bits with one or more of the random bytes:

Masked_Key:=Real_Key XOR Masking_Value.

The number of random bytes needed for the masking will depend on the key size, and the number of keys to be masked. When using multiple keys, the same or different random bytes may be used for masking the different keys. Once masked, the masked key (or keys) is stored in a specified location of a secure nonvolatile memory, such as an EEPROM.

The masked key (or keys) is loaded (step 18) from the specified memory location into a key register (or registers). The masked key (or keys) is then, used to decrypt the former encryption result (step 19), using the same cryptographic algorithm in an inverse direction from the original encryption. (Note that where multiple keys were used during the encryption, such as in triple-DES, the keys normally must be used in reverse order for correct decryption.) If we consider an encrypt function Encrypt (Data, Key, Mask) and a corresponding decrypt function Decrypt (Data, Key, Mask), and if we have Encrypt (VALID_DATA, Real_Key, 0) as the former encryption result (step 19), then the decryption in step 20 should be Decrypt (Encrypt (VALID_DATA, Real_Key, 0)), Masked_Key, Masking_Value)=VALID_DATA, if Real_Key=Masked_Key XOR Masking_Value.

The decryption result using the masked key is compared (step 20) to the valid data (VALID_DATA). The masked key should correspond to the generated verification signature (checksum) when encrypting the VALID_DATA. If the decryption result is not equal to the VALID_DATA, then masked key fails the integrity check, and a fault injection is flagged, (step 21). However, if the decryption result is equal to the VALID_DATA, then the masked passes the integrity check, and may be used. Once the integrity check is complete, all hardware registers used for the decryption and integrity check are wiped (step 22).

What is claimed is:

1. A method of protecting secret key integrity in a hardware cryptographic system subject to fault attacks, the method comprising:
    obtaining an encryption result and corresponding checksum from known data and a secret key to be protected;
    masking the secret key to obtain a masked key;
    loading the masked key into a key register;
    at any time prior to using a masked key in the hardware cryptographic system, first checking the integrity of the masked key by decrypting the encryption result with the masked key to obtain a decryption result and comparing the decryption result to valid data; and
    if the decryption result is not equal to valid data, then wiping all data relating to the masked key and flagging a fault injection.

2. The method as in claim 1, wherein obtaining an encryption result and corresponding checksum comprises loading the secret key to be protected in plain into a key register;
    presenting known data to an encryption algorithm and encrypting the known data using the secret key to obtain the encryption result;
    performing a checksum computation upon the encryption result to obtain the corresponding checksum; and
    saving the encryption result and checksum in a secure memory.

3. The method as in claim 2, wherein the checksum computation is a cyclic redundancy check (CRC) routine.

4. The method as in claim 1, wherein masking the secret key comprises generating random bytes using random number generator hardware and applying the random bytes to the secret key using a masking routine.

5. The method as in claim 4, wherein the masking routine is a bitwise-XOR operation of the random bytes and the secret key.

6. The method as in claim 4, wherein the random bytes are generated after seeding the random number generator hardware with a known seed, different seeds producing different sequences of random bytes.

7. A method of protecting secret key integrity in a hardware cryptographic system subject to fault attacks, the method comprising:
    loading a secret key to be protected in plain into a key register;
    presenting known data to an encryption algorithm and encrypting the known data using the secret key to obtain an encryption result;
    performing a checksum computation upon the encryption result to obtain a corresponding checksum; and
    saving the encryption result and checksum, and clearing the secret key from the key register;
    generating random bytes using random number generator hardware and applying the random bytes to the secret key using a masking routine to obtain a masked key;
    loading the masked key into a key register;
    decrypting the saved encryption result with the masked key to obtain a decryption result;
    comparing the decryption result to valid data; and
    if the decryption result is not equal to valid data, then wiping all data relating to the masked key and flagging a fault injection, but if the decryption result is equal to valid data, then certifying the integrity of the masked key for use in the cryptographic system.

8. The method as in claim 7, wherein the checksum computation is a cyclic redundancy check (CRC) routine.

9. The method as in claim 7, wherein the masking routine is a bitwise-XOR operation of the random bytes and the secret key.

10. The method as in claim 7, wherein the random bytes are generated after seeding the random number generator hardware with a known seed, different seeds producing different sequences of random bytes.

* * * * *